Dec. 17, 1968 G. J. YEREMIAN 3,416,522
STABILIZED NON-ADHERENT PAD
Filed Dec. 6, 1966

INVENTOR.
GEORGE J. YEREMIAN
BY David B. Ehrlinger

United States Patent Office 3,416,522
Patented Dec. 17, 1968

3,416,522
STABILIZED NON-ADHERENT PAD
George J. Yeremian, Greenwood, S.C., assignor to Parke, Davis & Company, Detroit, Mich., a corporation of Michigan
Filed Dec. 6, 1966, Ser. No. 599,574
3 Claims. (Cl. 128—156)

This invention relates to surgical dressings and more particularly to a stabilized non-adherent dressing of an improved type.

Prior to the present invention, available dressings have in general failed to provide the intended free, non-adherent release from the healing wound surface. One conventional dressing of the type in question, while not truly non-adherent, nevertheless achieves some improvement with a construction in which the wound is contacted by a smooth perforated plastic film-gauze laminate. One such dressing is shown in U.S. Patent No. 2,923,298. More recently, a material with superior non-adherent properties has been developed. This superior material, referred to below in detail, is a bonded laminate comprising needled webs of neutral organic plastic resin fiber and cellulosic material. One face of the laminate is composed of porous resin and this serves as the non-adherent contact surface for the wound. One difficulty with this laminated material, however, is that it has a relatively low abrasion resistance. Also, it tends to delaminate when employed in certain types of dressing, particularly under stress of normal wear. A consequence of abrasion and delamination is that fibrous particles and other small particles can become dislodged from the dressing onto the wound site from which their later removal may be difficult and even distressing.

It is an object of the present invention therefore to provide an improved non-adherent surgical dressing which is stabilized against abrasion, delamination, etc.

It is also an object of the invention to provide an economical non-adherent surgical dressing which can be efficiently made in large volume.

Another object is to provide a surgical dressing which can be safely applied to the wound site and kept there for indefinite periods under widely varying condition of use without risk of introducing extraneous debris or particles to the wound site.

Still another object is to provide an improved surgical dressing which can readily be manufactured and packaged and thereafter distributed and used under sterile conditions, all the while retaining its intended structural integrity and aesthetic usefulness.

Figure 1:
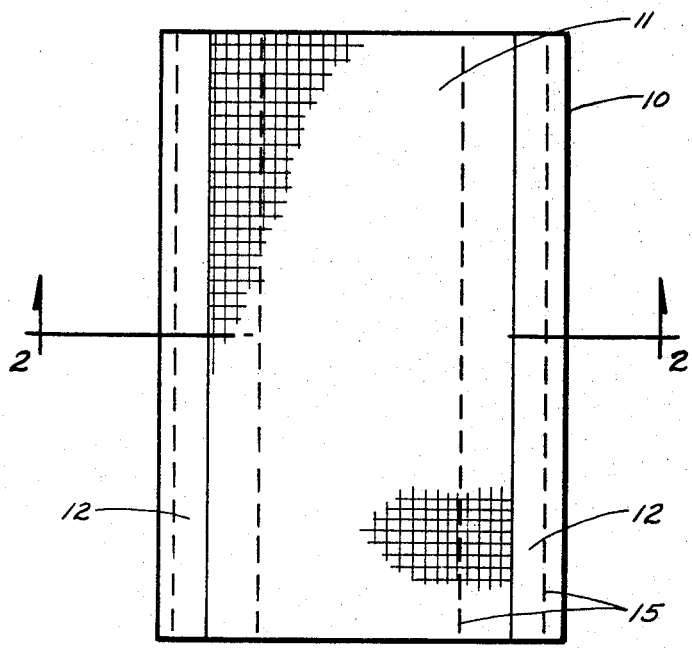
Figure 2:
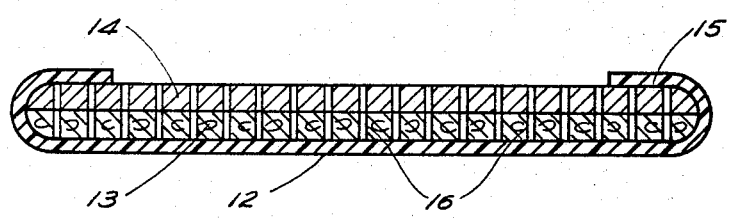

Other objects, advantages, and purposes will be seen in the following description in reference to the accompanying drawings in which:

FIG. 1 is a plan view of a dressing according to the invention showing a non-adherent pad secured in a backing strip; and FIG. 2 is a diagrammatic cross-section of the dressing of FIG. 1 taken on line 2—2.

As seen in FIG. 2 the dressing 10 of the invention comprises a backing strip 12 securing a laminated pad comprising a cellulosic layer 13 and a resin fiber layer 14. The pad and backing are preferably rectangular but can be any of a wide variety of sizes, shapes, thicknesses, etc., for application to various parts of the body, depending on particular requirements. The pad, as is shown, has the non-adherent surface 11 exposed for direct application to the wound site. At least two of the opposite edges of the pad as well as the face of the cellulosic layer 13 are covered over by the backing strip. The backing strip in turn is secured to the pad by adhesive seal lines 15 along the margins of the non-adherent face 11 and along spaced parallel adhesive lines 15 between the face of the cellulosic layer and the backing strip. Supplementary adhesive means affording enhanced rigidity particularly at the lateral edges of the pad, can also be provided if desired. The type of backing and adhesive means employed is not critical. Desirably the backing material is selected to simulate the properties of the skin in respect to flexibility, comfort, breathability, etc. If desired, the backing can be moisture resistant or completely moisture impermeable. For example, high wet strength paper, non-woven bonded fabrics, thermoplastic cast and extruded organic films and the like can be employed. The adhesive means can be any inert sealing means including pressure sensitive elastomers, hot melt seals, thermoplastic resin bonds, etc.

The dressing as seen in FIG. 2 includes the layers 13 and 14 constituting a pad enveloped by the backing strip 12 contacting the absorbent layer, the pad edges and the margins of the non-adherent surface 11. The latter surface is exposed for direct contact with the wound. Referring further to the construction of the pad, the cellulosic layer is one having moisture absorption properties and is composed of a non-woven mat or web of natural fibers such as cotton, artificial fibers such as rayon, and mixtures of such fibers; the layers may also contain other fibers or adjuvants such as an inert thermoplastic olefinic bonding fiber, e.g., polypropylene. The resin fiber layer is one permitting free flow to moisture and yet inert and compatible with the wound surface. Any of various resins or mixtures of resins which meet these requirements and which are thermoplastic, as will be hereinafter described, will be satisfactory. The polyolefins such as polyethylene, polypropylene, etc., and other similar inert resin materials are suitable. Polypropylene is preferred for its ability to withstand steam sterilization. Other absorbent layers such as cellulose wadding, open weave textile and the like can if desired be included with the cellulosic layer. The cellulosic layer and the resin fiber layer in the pad are secured together by needling and heat fusion. In the needling operation used to produce pads of this type, the somewhat loose laminate is processed through a needling machine wherein the needles are injected through the laminate causing the ensnared resin fibers to pass through the cellulosic layer at random spaced points, and the needled fibers 16 are heat fused in place. Fusion of the needled laminate is accomplished conveniently by passing the needled laminate through pressure rolls with the resin fiber layer in direct contact with the heat surface to cause the fibers to soften, merge and rearrange to a substantially flat, smooth integral porous surface with the needled fibers likewise merged into the compressed cellulosic mat. Upon cooling, immediately after leaving the pressure rolls, the resin hardens and the compressed webs are thus transformed into a single integrated laminate having the characteristics of a smooth durable dense blanket structure.

For purposes of illustration, a suitable needled, pressure-secured pad can be made using a sheet of cellulose wadding (14 lbs./ream) laid over non-woven web of rayon fibers (1⅛″ length, 3 denier. A like web of non-woven polypropylene fibers is next laid over the first web (to provide a weight ratio per unit area of 46 parts polypropylene, 21 parts wadding and 33 parts rayon) and the resulting laminate weighing about 4¾ ounces per square yard is passed through a needling machine having 9 barbs per needle to give between 100–120 needle perforations per square inch entering the resin surface through the laminate. The needled laminate is then fed through heat rolls for average exposure of ½ second to 20 pounds per square inch and temperatures above 270° F. sufficient to fuse the resin and provide a smooth surface with non-adherent characteristics. The resulting laminated pad material which is an improvement over prior non-adherent materials is nevertheless unsatisfactory, as indicated above, because of delamination, low resistance to abrasion, etc.

According to the present invention, however, freedom from abrasion damage, delamination and the like is advantageously obtained by the combination of the pad and the backing strip 12 adhesively secured at the edges of the pad and at spaced points along at least a major axis of the pad backing surface sufficient to render the pad resistant to sheering forces in the plane of the pad. The major axis of the pad for purposes of the invention will be understood to be the lengthwise dimension (as opposed to the width) in cases of oblong or rectangular shapes. If desired, the backing can also overlap the width edges of the pad. An advantageous feature of the dressing of the invention is the provision of supplementary absorbent means in any desired quantity between the cellulosic layer of the pad and the backing. A preferred construction is one which utilizes such supplementary absorbent means provided with thermoplastic fiber seal zones, hot melt seal lines, etc. for purposes of high speed sealing along a moving web.

The invention contemplates the provision of a protective envelope suited for sterilizing and maintaining the dressing in sterile condition for ultimate application to the wound site.

I claim:

1. In a surgical dressing having a non-adherent laminated pad with at least one cellulosic layer and a porous resin fiber layer mutually secured by needling means, the improvement comprising a backing strip for the pad adhesively secured at edges of the pad and at spaced points along at least a major axis of the pad backing surface sufficient to render the pad resistant to sheering forces in the plane of the pad.

2. A surgical dressing according to claim 1 wherein the pad has an oblong shape and is provided with absorbent means in the backing supplementary to the absorbent means in the pad.

3. A surgical dressing according to claim 1 wherein the pad comprises a needled non-woven rayon-polypropylene fiber heat bonded laminate and the backing is secured to the pad by thermoplastic adhesive seal means.

References Cited

UNITED STATES PATENTS

| | | | |
|---|---|---|---|
| 2,923,298 | 2/1960 | Dookstader et al. | 128—296 |
| 3,122,141 | 2/1964 | Crowe | 128—296 |
| 3,229,691 | 1/1966 | Crowe | 128—156 |
| 3,331,728 | 7/1967 | Lane | 161—112 |
| 3,369,547 | 2/1968 | Sack et al. | 128—296 |

ADELE M. EAGER, *Primary Examiner.*

U.S. Cl. X.R.

128—296, 132, 268; 161—112